US008905839B1

(12) United States Patent
Watanuki et al.

(10) Patent No.: US 8,905,839 B1
(45) Date of Patent: Dec. 9, 2014

(54) NON-TRANSITORY COMPUTER-READABLE STORAGE MEDIUM STORING GAME PROGRAM, AND INFORMATION PROCESSING DEVICE

(71) Applicant: DeNA Co., Ltd., Tokyo (JP)

(72) Inventors: Tomoya Watanuki, Tokyo (JP); Sadaaki Satsuma, Tokyo (JP); Akihiro Suga, Tokyo (JP); Satoshi Kagami, Tokyo (JP); Keisuke Kamiyama, Tokyo (JO); Shota Tanaka, Tokyo (JP); Makoto Yamaguchi, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/173,668

(22) Filed: Feb. 5, 2014

(30) Foreign Application Priority Data

Jun. 19, 2013 (JP) ................................ 2013-128301

(51) Int. Cl.
*A63F 9/24* (2006.01)
*A63F 13/00* (2014.01)
*G07F 17/32* (2006.01)

(52) U.S. Cl.
CPC .......... *G07F 17/329* (2013.01); *G07F 17/3274* (2013.01); *G07F 17/3281* (2013.01)
USPC ................................. 463/23; 463/40; 463/42

(58) Field of Classification Search
CPC ................................................... G07F 17/3281
See application file for complete search history.

(56) References Cited

U.S. PATENT DOCUMENTS

| | | | | |
|---|---|---|---|---|
| 7,572,187 | B2 * | 8/2009 | Van Luchene | 463/42 |
| 7,690,990 | B2 * | 4/2010 | Van Luchene | 463/25 |
| 7,717,782 | B2 * | 5/2010 | Van Luchene | 463/9 |
| 8,172,685 | B2 * | 5/2012 | Englman et al. | 463/42 |
| 8,221,243 | B2 * | 7/2012 | Van Luchene | 463/42 |
| 8,425,323 | B2 * | 4/2013 | Fiden et al. | 463/42 |
| 8,454,442 | B2 * | 6/2013 | Van Luchene | 463/42 |
| 8,469,821 | B2 * | 6/2013 | Van Luchene | 463/42 |
| 8,496,524 | B2 * | 7/2013 | Vancura | 463/25 |
| 8,622,812 | B2 * | 1/2014 | Englman et al. | 463/25 |
| 2007/0087799 | A1 * | 4/2007 | Van Luchene | 463/1 |
| 2010/0130276 | A1 * | 5/2010 | Fiden et al. | 463/16 |
| 2012/0184362 | A1 * | 7/2012 | Barclay et al. | 463/25 |

(Continued)

FOREIGN PATENT DOCUMENTS

| | | | | |
|---|---|---|---|---|
| JP | 5145467 | B1 * | 2/2013 |
| JP | 5145468 | B1 * | 2/2013 |
| JP | 2013-052285 | A | 3/2013 |

*Primary Examiner* — Steven J Hylinski
(74) *Attorney, Agent, or Firm* — Procopio, Cory, Hargreaves & Savitch LLP

(57) ABSTRACT

A program causes a computer to execute a process of, upon receiving a content request from a player, consuming the lottery point associated with the player, and executing a lottery game for the player, upon receiving a support request for supporting a first player playing the lottery game by a second player, giving a lottery point to the first player and the second player without consuming a play point of the second player, upon receiving a special support request for supporting a first player playing the lottery game by a second player, consuming a play point of the second player and giving a lottery point to the first player and the second player, and limiting the number of executions of the support process to a predetermined number or smaller and permitting execution of the special support process a number of times larger than the predetermined number.

6 Claims, 16 Drawing Sheets

(56) References Cited

U.S. PATENT DOCUMENTS

2012/0283011 A1* 11/2012 Van Luchene .................. 463/29
2012/0283014 A1* 11/2012 Van Luchene .................. 463/31
2014/0206452 A1* 7/2014 Bambino et al. ................ 463/40
2014/0256434 A1* 9/2014 Bronstein Bendayan ...... 463/31

* cited by examiner

FIG. 4
| CARD ID | CHARACTER NAME | CHARACTER IMAGE | RARITY | INITIAL ATTACK STRENGTH | INITIAL DEFENSE STRENGTH | INITIAL HIT POINT |
|---|---|---|---|---|---|---|
| 0001 | CHARACTER A | 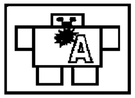 | COMMON | 15 | 8 | 10 |
| 0002 | CHARACTER B | 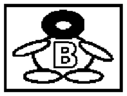 | UNCOMMON | 30 | 20 | 15 |
| 0003 | CHARACTER C | 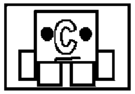 | RARE | 45 | 30 | 25 |
| 0004 | CHARACTER D | 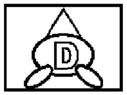 | SUPER RARE | 60 | 55 | 60 |
| ⋮ | ⋮ | ⋮ | ⋮ | ⋮ | ⋮ | ⋮ |

*FIG. 5*

| ITEM ID | ITEM NAME | PRICE |
|---|---|---|
| 0001 | ITEM A | 100 |
| 0002 | ITEM B | 200 |
| 0003 | ITEM C | 300 |
| ⋮ | ⋮ | ⋮ |

FIG. 6

| PLAYER ID | FRIEND PLAYER ID | VIRTUAL CURRENCY | POSSESSED BALLS | POSSESSED CARD INFORMATION | POSSESSED ITEM INFORMATION | DECK INFORMATION |
|---|---|---|---|---|---|---|
| 1 | 5, 8 | 0 | 20 | POSSESSED CARD INFORMATION (1) | POSSESSED ITEM INFORMATION (1) | DECK INFORMATION (1) |
| 2 | NONE | 500 | 3 | POSSESSED CARD INFORMATION (2) | POSSESSED ITEM INFORMATION (2) | DECK INFORMATION (2) |
| 3 | 4, 6 | 700 | 8 | POSSESSED CARD INFORMATION (3) | POSSESSED ITEM INFORMATION (3) | DECK INFORMATION (3) |
| 4 | 3, 6 | 1000 | 50 | POSSESSED CARD INFORMATION (4) | POSSESSED ITEM INFORMATION (4) | DECK INFORMATION (4) |
| 5 | 1, 6 | 100 | 15 | POSSESSED CARD INFORMATION (5) | POSSESSED ITEM INFORMATION (5) | DECK INFORMATION (5) |
| 6 | 3, 4, 5 | 3000 | 1 | POSSESSED CARD INFORMATION (6) | POSSESSED ITEM INFORMATION (6) | DECK INFORMATION (6) |
| . | . | . | . | . | . | . |
| . | . | . | . | . | . | . |
| . | . | . | . | . | . | . |

| CARD PLACEMENT INFORMATION | NUMBER OF TIMES OF SUPPORT BY ANOTHER PLAYER | NUMBER OF TIMES OF SPECIAL SUPPORT BY ANOTHER PLAYER | NUMBER OF TIMES OF SUPPORT FOR ANOTHER PLAYER | NUMBER OF TIMES OF SPECIAL SUPPORT FOR ANOTHER PLAYER | SUPPORT LOG INFORMATION |
|---|---|---|---|---|---|
| CARD PLACEMENT INFORMATION (1) | 5 | 10 | 0 | 10 | SUPPORT LOG INFORMATION (1) |
| CARD PLACEMENT INFORMATION (2) | 3 | 7 | 1 | 5 | SUPPORT LOG INFORMATION (2) |
| CARD PLACEMENT INFORMATION (3) | 1 | 20 | 1 | 1 | SUPPORT LOG INFORMATION (3) |
| CARD PLACEMENT INFORMATION (4) | 0 | 1 | 0 | 4 | SUPPORT LOG INFORMATION (4) |
| CARD PLACEMENT INFORMATION (5) | 10 | 3 | 1 | 7 | SUPPORT LOG INFORMATION (5) |
| CARD PLACEMENT INFORMATION (6) | 15 | 30 | 0 | 9 | SUPPORT LOG INFORMATION (6) |
| . | . | . | . | . | . |
| . | . | . | . | . | . |
| . | . | . | . | . | . |

FIG. 7

⋮

POSSESSED CARD INFORMATION (3)

POSSESSED CARD INFORMATION (2)

POSSESSED CARD INFORMATION (1)

| CARD ID | ATTACK STRENGTH | DEFENSE STRENGTH | HIT POINT | ACQUISITION DATE AND TIME |
|---|---|---|---|---|
| 0011 | 15 | 10 | 200 | 2012/2/13 10:00 |
| 0211 | 20 | 23 | 150 | 2012/2/13 12:00 |
| 0133 | 70 | 45 | 100 | 2012/2/14 11:30 |
| 0201 | 22 | 40 | 600 | 2012/2/15 18:00 |
| 0072 | 60 | 50 | 250 | 2012/2/16 13:30 |
| 0094 | 300 | 200 | 450 | 2012/2/16 19:00 |
| · | · | · | · | · |
| · | · | · | · | · |
| · | · | · | · | · |

FIG. 8

POSSESSED ITEM INFORMATION (3)

POSSESSED ITEM INFORMATION (2)

POSSESSED ITEM INFORMATION (1)

| ITEM ID | NUMBER OF POSSESSED ITEMS |
|---|---|
| 0001 | 20 |
| 0002 | 10 |
| 0003 | 1 |
| ⋮ | ⋮ |

FIG. 9

DECK INFORMATION (3)

DECK INFORMATION (2)

DECK INFORMATION (1)

| NUMBER | RARITY | CARD ID |
|---|---|---|
| 1 | COMMON | 2011 |
| ⋮ | ⋮ | ⋮ |
| 100 | RARE | 1003 |
| ⋮ | ⋮ | ⋮ |
| 200 | RARE | 0823 |
| ⋮ | ⋮ | ⋮ |
| 300 | RARE | 0013 |
| ⋮ | ⋮ | ⋮ |
| 1200 | SUPER RARE | 0104 |

FIG. 10

CARD PLACEMENT INFORMATION (3)

CARD PLACEMENT INFORMATION (2)

| CARD PLACEMENT INFORMATION (1) | |
|---|---|
| AREA ID | CARD ID |
| 1 | 0051 |
| 2 | 1240 |
| 3 | 0756 |
| 4 | 1089 |
| 5 | 0133 |
| 6 | 0007 |
| 7 | 0936 |
| 8 | 0211 |
| 9 | 0011 |

FIG. 11

SUPPORT LOG INFORMATION (3)

SUPPORT LOG INFORMATION (2)

| SUPPORT LOG INFORMATION (1) | | | |
|---|---|---|---|
| No. | PLAYER ID | DETAIL | DATE AND TIME |
| 1 | 0051 | SUPPORT | 2012/2/17 10:00 |
| 2 | 0107 | SPECIAL SUPPORT | 2012/2/17 10:05 |
| 3 | 0315 | SUPPORT | 2012/2/17 10:06 |
| ⋮ | ⋮ | ⋮ | ⋮ |

NON-TRANSITORY COMPUTER-READABLE STORAGE MEDIUM STORING GAME PROGRAM, AND INFORMATION PROCESSING DEVICE

BACKGROUND OF THE INVENTION

1. Field of the Invention

The present invention relates to a non-transitory computer-readable storage medium storing a game program and an information processing device.

2. Description of Related Art

Game systems allowing a player in receipt of a request for support for another player to give the player a reinforcement point have been known (for example, JP 2013-52285 A).

SUMMARY OF THE INVENTION

With such a game system, the number of supports for another player is limited because the game balance will be lost as a result of points given in excess if unlimited supports for another player are permitted. This reduces the players' incentive to support other players, and does not encourage the players to fully communicate with one another.

The present invention has been made in view of the foregoing, and an objective is to stimulate communication between players.

A principal invention of the present invention to solve the aforementioned problems is a non-transitory computer-readable storage medium storing game program causing a computer to execute:

a recording process of recording a lottery point and a play point in association with each player in a storage unit;

a lottery process of, upon receiving a content request from a player, consuming the lottery point associated with the player, and executing a lottery game for giving a game content selected from multiple game contents to the player;

a support process of, upon receiving a support request for supporting a first player playing the lottery game by a second player, giving a lottery point to the first player and the second player without consuming a play point associated with the second player;

a special support process of, upon receiving a special support request for supporting a first player playing the lottery game by a second player, consuming a play point associated with the second player and giving a lottery point to the first player and the second player; and a number-of-executions control process of limiting the number of executions of the support process to a predetermined number or smaller and permitting execution of the special support process a number of times larger than the predetermined number.

Other features of the present invention will be apparent from the description of the present specification and the appended drawings.

Advantageous Effect of the Invention

According to the present invention, it is possible to stimulate communication between players.

BRIEF DESCRIPTION OF THE DRAWINGS

FIG. 4 is a table illustrating an example of a data structure of card information;

FIG. 5 is a table illustrating an example of a data structure of item information;

FIG. 6 is a table illustrating an example of a data structure of player information;

FIG. 7 is a table illustrating an example of a data structure of possessed card information;

FIG. 8 is a table illustrating an example of a data structure of possessed item information;

FIG. 9 is a table illustrating an example of a data structure of deck information;

FIG. 10 is a table illustrating an example of a data structure of card placement information;

FIG. 11 is a table illustrating an example of a data structure of support log information;

DETAILED DESCRIPTION OF THE INVENTION

Figure 1:
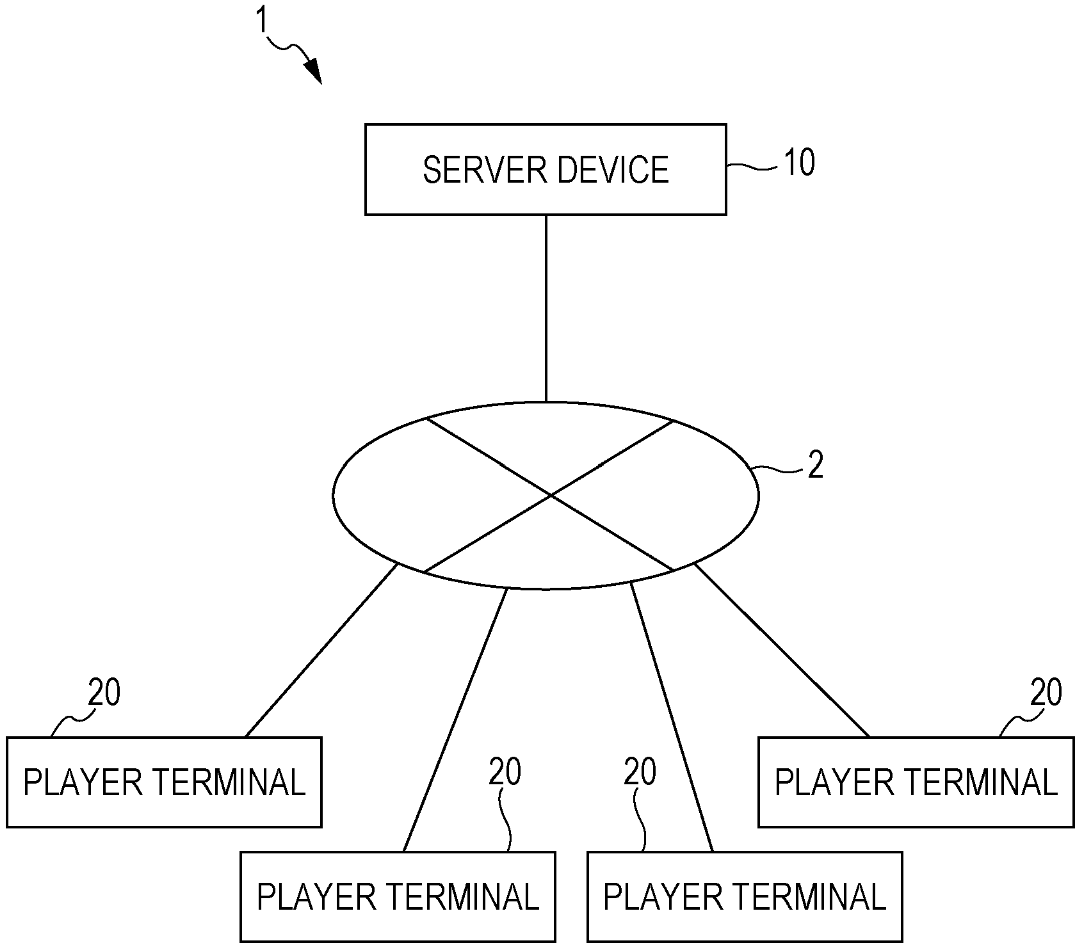
FIG. 1 is a diagram illustrating an overall configuration example of a game system.

At least the following matters will be apparent from the description of the present specification and the appended drawings:

Provided is a non-transitory computer-readable storage medium storing game program causing a computer to execute:

a recording process of recording a lottery point and a play point in association with each player in a storage unit;

a lottery process of, upon receiving a content request from a player, consuming the lottery point associated with the player, and executing a lottery game for giving a game content selected from multiple game contents to the player;

a support process of, upon receiving a support request for supporting a first player playing the lottery game by a second player, giving a lottery point to the first player and the second player without consuming a play point associated with the second player;

a special support process of, upon receiving a special support request for supporting a first player playing the lottery game by a second player, consuming a play point associated with the second player and giving a lottery point to the first player and the second player; and a number-of-executions control process of limiting the number of executions of the support process to a predetermined number or smaller and permitting execution of the special support process a number of times larger than the predetermined number.

According to such a program, the special support can be executed by consuming the play point even when the support of the second player for the first player playing the lottery game is limited, which can stimulate communication between players.

Furthermore, provided is a non-transitory computer-readable storage medium storing game program causing a computer to execute:

a recording process of recording a lottery point and a play point in association with each player in a storage unit;

a lottery process of, upon receiving a content request from a player, consuming the lottery point associated with the player, and executing a lottery game for giving a game content selected from multiple game contents to the player;

a support process of, upon receiving a support request for supporting a first player playing the lottery game by a second player, consuming a predetermined amount of play point associated with the second player and giving a lottery point to the first player and the second player;

a special support process of, upon receiving a special support request for supporting a first player playing the lottery game by a second player, consuming an amount of play point associated with the second player larger than the predetermined amount and giving a lottery point to the first player and the second player; and a number-of-executions control process of limiting the number of executions of the support process to a predetermined number or smaller and permitting execution of the special support process a number of times larger than the predetermined number.

According to such a program, the special support can be executed by consuming a larger amount of play point even when the support of the second player for the first player playing the lottery game is limited, which can stimulate communication between players.

Furthermore, the program may further cause the computer to execute:

an exchange process of, upon receiving an exchange request from the second player, a play point associated with the second player for a game item; and an acquisition game process of, upon receiving a game start request from the second player, conducting a game allowing the second player to acquire a lottery point by consuming the game item, and a proportion of the amount of lottery point given in the special support process to the amount of play point consumed in the special support process may be set to be larger than a proportion of the amount of lottery point acquired through the acquisition game process to the amount of play point exchanged for the game item in the exchange process.

According to such a program, the use of special support is encouraged, which can further stimulate communication between players.

The program may further cause the computer to execute:

a screen data generation process of, upon receiving a viewing request from a second player for viewing game contents for the first player playing the lottery game, generating a game screen for allowing the second player to view the candidate game contents that are candidates for selection in the lottery game being played by the first player, and in the screen data generation process, the game screen in a different display state may be generated when the viewing request from the second player is a viewing request for viewing the candidate contents for the first player who has been specially supported.

According to such a program, the use of special support is encouraged, which can further stimulate communication between players.

The program may further cause the computer to execute:

a count process of counting the numbers of executions of the support process and the special support process, and in the lottery process, a proportion with which a special game content is selected in the lottery game may be increased according to the numbers counted in the count process.

According to such a program, the use of support and special support is encouraged, which can further stimulate communication between players.

Embodiment

<<Configuration of Game System 1>>

FIG. 1 is a diagram illustrating an example of an overall configuration of a game system 1 according to the present embodiment. The game system 1 provides players with various services related to games through a network 2 (for example, the Internet), and includes a server device 10 and a plurality of player terminals 20.

<<Configuration of Server Device 10>>

Figure 2:
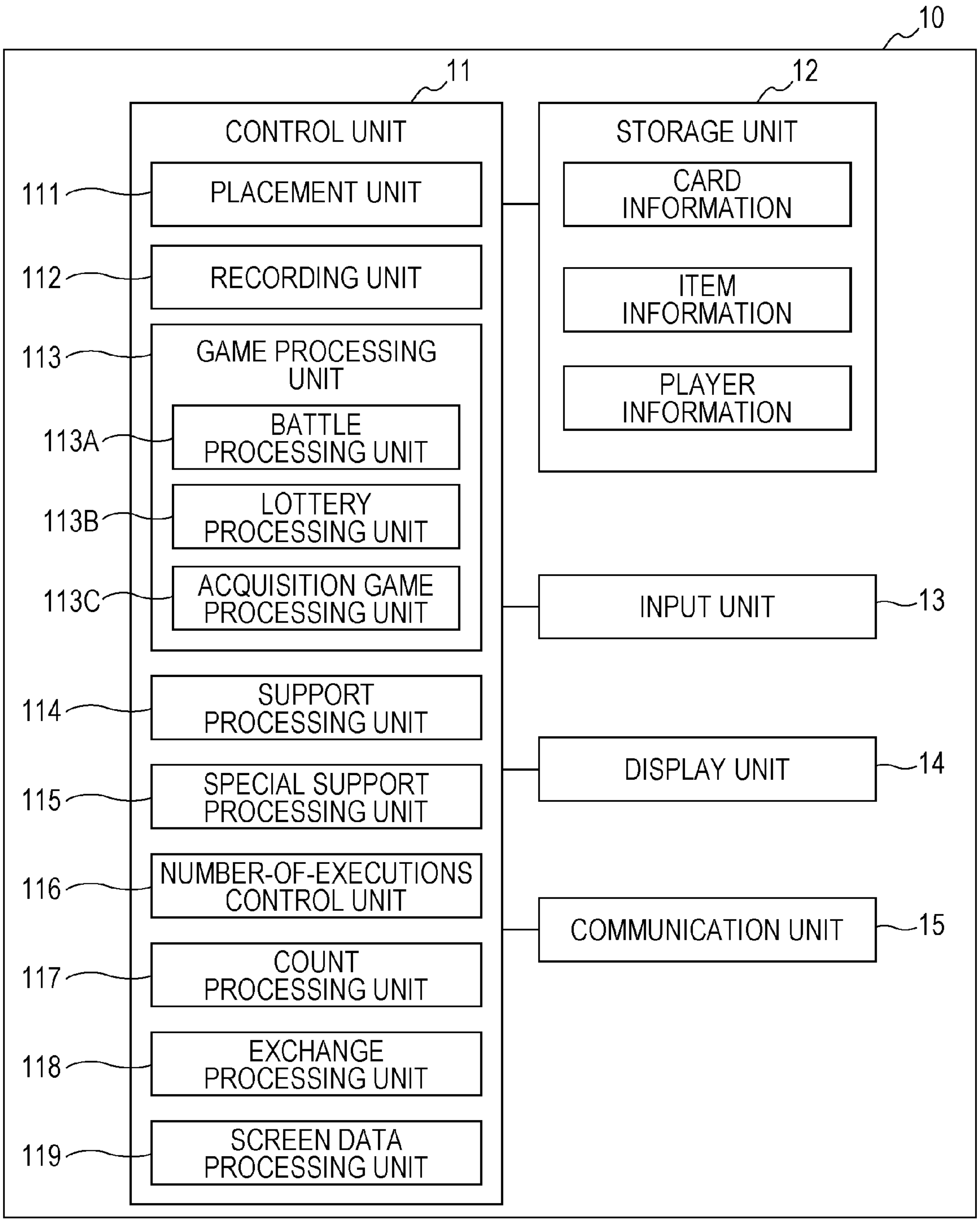
FIG. 2 is a block diagram illustrating a functional configuration of a server device.

FIG. 2 is a block diagram illustrating a functional configuration of the server device 10 according to the present embodiment. The server device 10 is an information processing device (for example, a workstation, a personal computer, or the like) used when a system administrator or the like manages a game service. The server device 10 can distribute game programs operable on the player terminals 20, and web pages (such as game screens) made in a markup language (such as HTML) according to the specification of the player terminals 20 upon receiving various commands (requests) from the player terminals 20. The server device 10 includes a control unit 11, a storage unit 12, an input unit 13, a display unit 14, and a communication unit 15.

The control unit 11 is configured to pass data among the units and control the entire server device 10, and is realized by a central processing unit (CPU) executing a program stored in a predetermined memory. The control unit 11 of the present embodiment includes a placement unit 111, a recording unit 112, a game processing unit 113, a support processing unit 114, a special support processing unit 115, a number-of-executions control unit 116, a count processing unit 117, an exchange processing unit 118, and a screen data generation unit 119.

The placement unit 111 has a function to execute a process of placing multiple game contents in a game content placement area composed of multiple unit areas. A game content refers to an electronic game card, figure or the like associated with a character or the like, or an item or the like such as a tool or an ability that can be used in a game. The placement unit 111 of the present embodiment places game cards that are an example of the game contents in a card placement area that is an example of the game content placement area.

The recording unit 112 is connected to the storage unit 12 via a bus, and has a function to execute a process of recording various data into the storage unit 12 in response to commands from the control unit 11. The recording unit 112 of the present embodiment records lottery points (balls, for example) and play points (virtual currency, for example) in association with each player, for example, in the storage unit 12.

The game processing unit 113 has a function to execute a game process. The game processing unit 113 includes a battle processing unit 113A, a lottery processing unit 113B, and an acquisition game processing unit 113C. The battle processing unit 113A has a function to execute various processes on a battle between a player character and an opponent character such as a process of determining an outcome of the battle. The lottery processing unit 113B consumes lottery points associated with a player and executes a lottery game of giving a game content selected from multiple game contents in response to a content request from the player. The acquisition game processing unit 113C executes an acquisition game of allowing a player to acquire a lottery point in response to a game start request from the player.

The support processing unit 114 has a function to execute a support process for supporting a player. The support processing unit 114 of the present embodiment gives points (balls, for example) to a first player (a player who is going to be supported by another player) and a second player (a player who is going to support another player) without consuming play points (virtual currency, for example) associated with the second player in response to a support request from the second player to support the first player.

The special support processing unit 115 has a function to execute a special support process for specially supporting a player. The special support processing unit 115 of the present embodiment consumes play points (virtual currency, for example) associated with a second player (a player who is going to specially support another player) and gives lottery points (balls, for example) to a first player (a player who is going to be specially supported by another player) and the second player in response to a special support request from the second player to specially support the first player.

The number-of-executions control unit 116 has a function to execute a process of controlling the number of executions of the support process by the support processing unit 114 and the number of executions of the special support process by the special support processing unit 115. The number-of-executions control unit 116 of the present embodiment limits the number of executions of the support process to a predetermined number or smaller (once or a smaller number of times, for example) and permits the special support process to be executed a number of times larger than the predetermined number.

The count processing unit 117 has a function to execute a count process of counting the number of times the support process is executed by the support processing unit 114 and the number of times the special support process is executed by the special support processing unit 115.

The exchange processing unit 118 has a function to execute an exchange process of exchanging play points associated with a player for a game item. The exchange processing unit 118 of the present embodiment exchanges play points (virtual currency, for example) associated with a player for a game item in response to an exchange request from the player. In other words, in the present embodiment, a player can purchase (exchange) a game item by consuming virtual currency that the player has.

The screen data generation unit 119 has a function to execute a process of generating screen data for displaying a game screen on the player terminals 20. The screen data generation unit 119 of the present embodiment generates HTML data as the screen data corresponding to the game screen.

The storage unit 12 includes a read only memory (ROM) that is a read only storage area in which a system program is stored, and a random access memory (RAM) that is a rewritable storage area used as a work area for arithmetic processing by the control unit 11. The storage unit 12 is, for example, realized by a non-volatile storage device, such as flash memory or a hard disk. The storage unit 12 of the present embodiment stores at least card information that is information on game cards, item information that is information on game items, and player information that is information on players. Details of the information will be described later.

The input unit 13 is used by the system administrator or the like for inputting various data (for example, the card information or the like), and is realized, for example, by a keyboard, a mouse, and the like.

The display unit 14 is used for displaying an operation screen for the system administrator on the basis of a command from the control unit 11, and is realized, for example, by a liquid crystal display (LCD) or the like.

The communication unit 15 is used for performing communication with the player terminals 20, and has a function as a reception unit to receive various data and signals transmitted from the player terminals 20, and a function as a transmission unit to transmit various data and signals to the player terminals 20 according to commands from the control unit 11. The communication unit 15 is realized, for example, by a network interface card (NIC), or the like.

<<Configuration of Player Terminal 20>>

Figure 3:
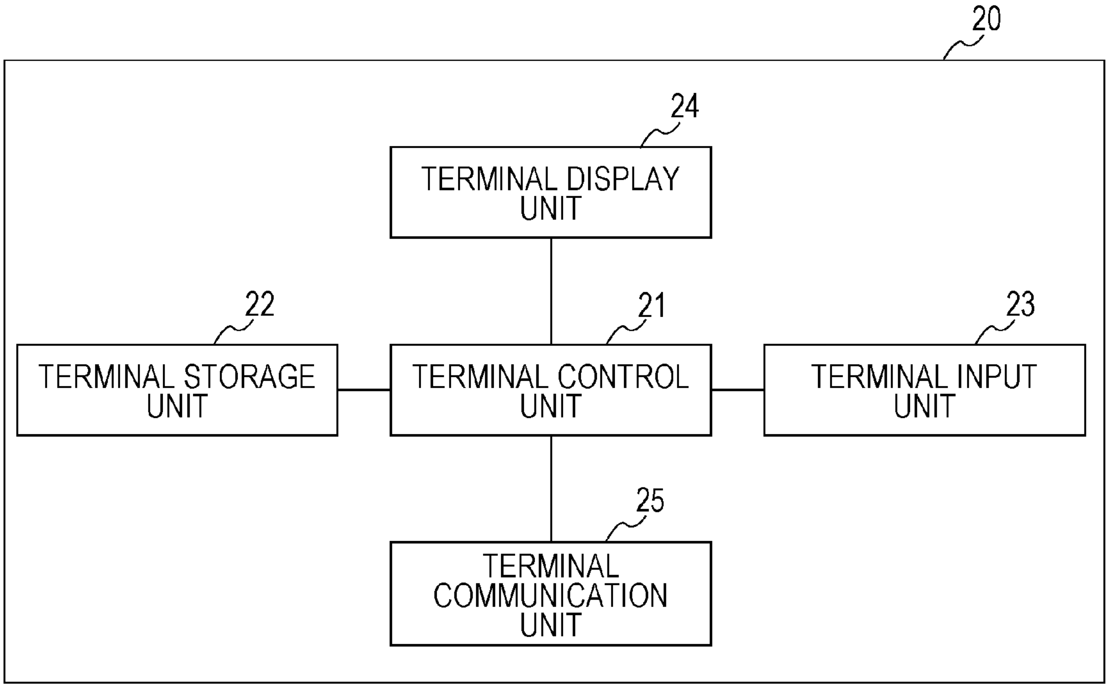
FIG. 3 is a block diagram illustrating a functional configuration of a player terminal.

FIG. 3 is a block diagram illustrating a functional configuration of the player terminal 20. The player terminal 20 of the present embodiment is an information processing device (for example, a mobile phone terminal, a smart phone, or the like) used by a player when playing a game, and can request the server device 10 to deliver various types of information (a game program, a web page, or the like) related to the game. The player terminal 20 has a web browser function for allowing the player to browse a web page, and thus can display a web page (a game screen, or the like) delivered from the server device 10. The player terminal 20 includes a terminal control unit 21, a terminal storage unit 22, a terminal input unit 23, a terminal display unit 24, and a terminal communication unit 25.

The terminal control unit 21 is configured to pass data among the units and control the entire player terminal 20, and is realized by a central processing unit (CPU) executing a program stored in a predetermined memory. Note that the terminal control unit 21 of the present embodiment also functions as a screen display control unit that controls the display format of a game screen displayed on the terminal display unit 24. The terminal storage unit 22 is connected to the terminal control unit 21 through a bus, and performs processing of referring to, reading out, and rewriting stored data according to a command from the terminal control unit 21. The terminal storage unit 22 is realized, for example, by flash memory, a hard disk, or the like. The terminal input unit 23 is used for performing various operations (a game operation, and the like) by the player, and is realized, for example, by an operation button, a touch panel, and the like. The terminal display unit 24 is used for displaying a game screen according to a command from the terminal control unit 21, and is realized, for example, by a liquid crystal display (LCD) and the like. The terminal communication unit 25 functions as a transmission/reception unit for transmitting/receiving various types of information to/from the server device 10 through the network 2, and is realized, for example, by a network interface card (NIC), or the like.

<<Data Structure>>

FIG. 4 is a table illustrating an example of a data structure of the card information stored in the storage unit 12 of the server device 10. The card information contains items (fields) such as a card ID, a character name, a character image, rarity, an attack strength, a defense strength, and a hit point. The card ID is identification information for identifying a game card that is an example of the game content. The character name is information indicating a display name of a character associated with a game card. The character image is image data of a character. The rarity is a parameter indicating the degree of rarity of a game card. In the present embodiment, four classes of rarity ("common"→"uncommon"→"rare" "super rare") are set for game cards (characters). An initial attack strength, an initial defense strength, and an initial hit point of a character are parameters indicating ability values initially set for the character.

FIG. 5 is a table illustrating an example of a data structure of the item information stored in the storage unit 12 of the server device 10. The item information contains fields such as an item ID, an item name, and a price. The item ID is identification information for identifying an item. The item name is information indicating a display name of an item. The price is information indication the value of an item.

FIG. 6 is a table illustrating an example of a data structure of the player information stored in the storage unit 12 of the server device 10. The player information contains fields such as a player ID, a friend player ID, virtual currency, possessed balls, possessed card information, possessed item information, deck information, card placement information, the number of times of support by another player, the number of times of special support by another player, the number of times of support for another player, the number of times of special support for another player, and support log information. The player ID is identification information for identifying a player. The friend player ID is identification information for identifying another player registered in a friend list of a player. The virtual currency is an example of play points and is information indicating the amount of virtual currency possessed by a player. A player can purchase and possess the virtual currency. The possessed balls are information indicating the number of balls possessed by a player and updated when a player has acquired a ball or consumed a ball. The balls are an example of the lottery points used in a lottery game, and are given to support or specially support another player or according to a result of an acquisition game. The possessed card information is information indicating game cards (hereinafter also referred to as possessed cards) possessed by a player. The possessed item information is information indicating items (hereinafter also referred to as possessed items) possessed by a player. The deck information is information on a deck. A deck refers to a card group of multiple cards put into a set. The card placement information is information on the card placement area. The number of times of support by another player is information indicating a cumulative number of times the support process of being supported is executed. The number of times of special support by another player is information indicating a cumulative number of times the special support process of being specially supported is executed. The number of times of support for another player is information indicating a cumulative number of times the support process of supporting another player is executed. The number of times of special support for another player is information indicating a cumulative number of times the special support process of specially supporting another player is executed. The support log information is history information recording supports for a player.

FIG. 7 is a table illustrating an example of a data structure of the possessed card information. The possessed card information contains fields such as a card ID, an attack strength, a defense strength, a hit point, and acquisition date and time of a possessed card, and the like. The card ID is identification information for identifying a possessed card. The attack strength, the defense strength, and the hit point of a possessed card are parameters indicating ability values set for a character associated with the possessed card. These parameters are updated according to a result of a game or the like. The acquisition date and time is information indicating the date and time when a player acquired a possessed card.

FIG. 8 is a table illustrating an example of a data structure of the possessed item information. The possessed item information contains fields of an item ID and the number of possessed items. The item ID is identification information for identifying each of various items possessed by a player. The number of possessed items is information indicating the number of items possessed by a player.

FIG. 9 is a table illustrating an example of a data structure of the deck information. The deck information is information on multiple game cards with serial numbers (card IDs) each in association with rarity. The deck of the present embodiment is a card group including 1200 game cards with serial numbers of 1 to 1200 arranged in numerical order as illustrated in FIG. 9. Game cards selected in numerical order from the deck are placed in the card placement area. "Rare" cards are set at predetermined intervals such as the 100th, 200th, 300th . . . cards, and a "super rare" card is set at the 1200th card. Cards with the other numbers are set to "common" or "uncommon" cards. A plurality of decks each composed of 1200 cards is provided for each player, and is sequentially replaced one set by one set. Thus, the decks are equivalent to a deck in which one "super rare" card is set every 1200 cards. Alternatively, the serial numbers of the game cards in a deck may be randomly set.

FIG. 10 is a table illustrating an example of a data structure of the card placement information. The card placement information contains fields of an area ID and a card ID. The area ID is identification information for identifying a unit area in the card placement area. The card placement area of the present embodiment is divided into nine unit areas, and nine area IDs are thus set. The card ID is identification information for identifying a game card (character) placed in a unit area with an associated area ID. The card placement information is updated each time game cards placed in the unit areas are changed.

FIG. 11 is a table illustrating an example of a data structure of the support log information. The support log information contains fields of a player ID, a detail, and date and time. When a support process or a special support process is executed in response to a support request or a special support request from another player to support a player, the player ID of the supporting or specially supporting player, the detail of the support (support or special support), and the date and time when the support process or the special support process is executed are stored in the support log information of the present embodiment.

<<Game Outline>>

Here, an outline of a game provided by the game system 1 of the present embodiment will be described. The game system 1 provides various games conducted by using electronic game cards (virtual cards used in games) associated with game characters.

<Battle Game>

In the game system 1 of the present embodiment, a player can possess multiple game cards. The player can play a battle game by using a game card (player character) selected from the game cards that the player possesses. Specifically, the battle processing unit 113A determines an opponent character that is an opponent of the player character, and determines an outcome of a battle game between these characters on the basis of various parameters (attack strength, defense strength, hit point, and the like) set for the respective characters.

<Lottery Game>

With the game system 1 of the present embodiment, a target hitting game that is an example of a lottery game to give a game card to a player is conducted. In the target hitting game, one lottery is conducted when a player throws (consumes) one or nine balls to game cards placed in the card placement area divided into 3×3=9 squares (unit areas), and one game card or all of nine game cards in the card placement area are given to the player.

In the target hitting game of the present embodiment, each player is provided with a plurality of decks each composed of one set of 1200 game cards. After a game card is given to a player and the number of cards in the card placement area decreases as a result of the target hitting game, a game card selected in numerical order from a deck is supplied into the card placement area. When the number of game cards in the deck decreases and becomes insufficient as a result of repeated supply of game cards, the deck is replaced with the next new deck. The game system 1 can thus constantly provide a player with the target hitting game.

In the target hitting game of the present embodiment, a special card (a "super rare" card, for example) may be placed when a game card is supplied to the card placement area. The player can try the target hitting game in an attempt to acquire the special card.

<Support, Special Support>

With the game system 1 of the present embodiment, a player (hereinafter also referred to as a "supporting player" (second player)) can support or specially support a player (hereinafter also referred to as a "supported player" (first player)) trying the target hitting game in an attempt to acquire a special card. The players can communicate with one another through the support or the special support.

In the present embodiment, a supporting player can support a supported player only once without consuming the virtual currency. When a supporting player supports a supported player, one ball is given to each of the supported player and the supporting player. The players can play the target hitting game described above by using the given balls. A supporting player can also specially support a supported player by consuming the virtual currency. When a supporting player supports a supported player, three balls are given to each of the supported player and the supporting player.

Note that the supporting player may consume an amount of virtual currency (10 coins, for example) that is smaller than the amount of virtual currency (30 coins, for example) consumed for a special support to support a supported player.

Furthermore, in the present embodiment, the number of times of support is limited to one but the number of times of special support is up to ten. Thus, a supporting player can specially support a supported player by consuming the virtual currency although the support for the supported player is limited, which can stimulate communication between players.

If a supported player succeeds in acquiring a special card in the target hitting game as a result of special support by a supporting player, a special item is given to the supporting player as a reward.

<Acquisition Game>

With the game system 1 of the present embodiment, an acquisition game allowing a player to acquire a ball to be used in the target hitting game is conducted. In the acquisition game, a player can acquire one ball if he/she succeeds in catching a predetermined character (game card) encountered during the game. For catching a predetermined character, a player can use a predetermined item. A player can catch a predetermined item without fail by using a predetermined item.

In this manner, a player can acquire balls not only by the support or the special support described above but also by playing the acquisition game.

<<Operation of Game System 1>>

Here, an example of operation of the game system 1 according to the present embodiment will be described. With the game system 1 of the present embodiment, operation on the target hitting game, operation on the support or the special support, and operation on the acquisition game are performed. Hereinafter, the operations will be described more specifically.

<Operation on Target Hitting Game>

Figure 12:
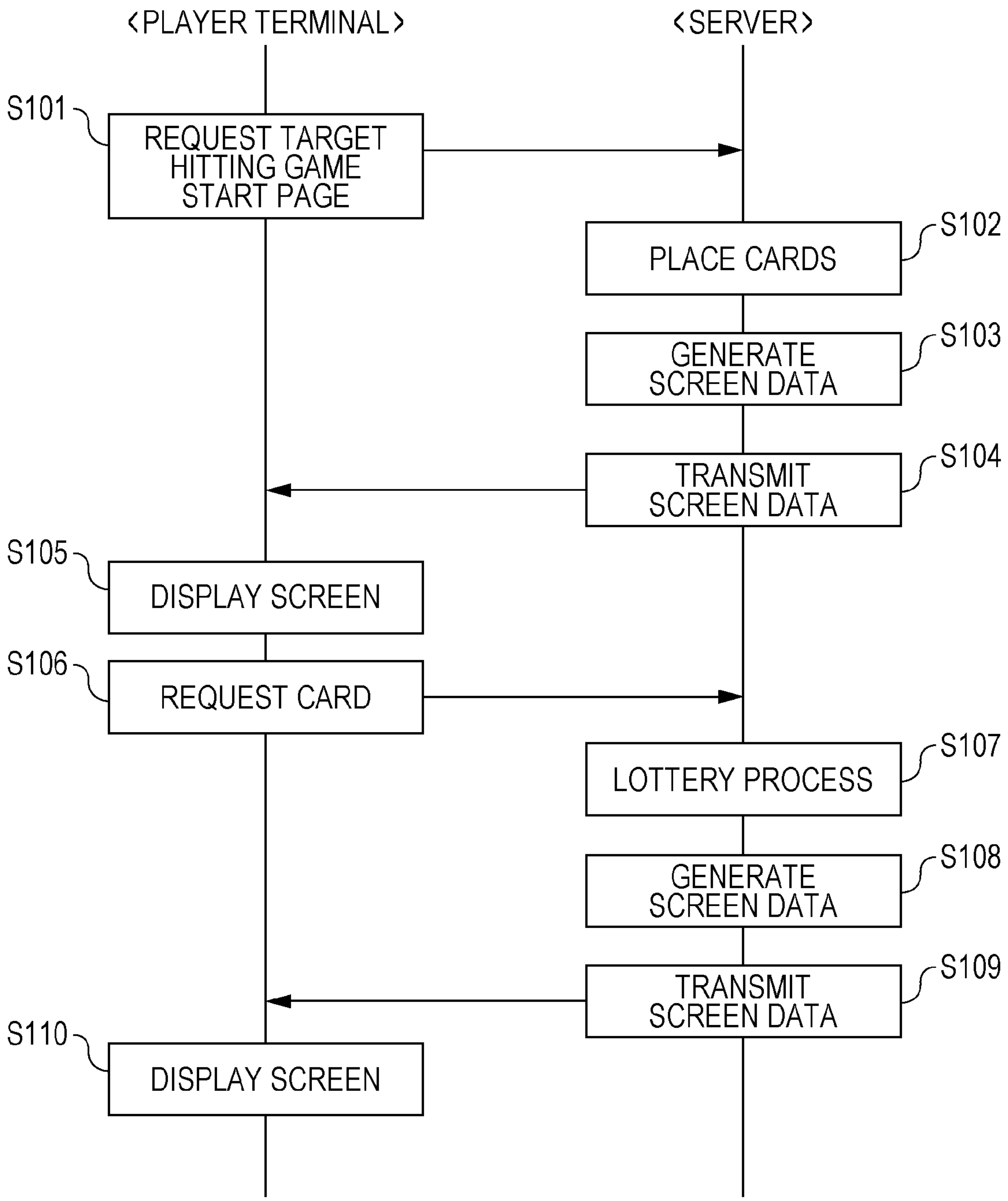
FIG. 12 is a flowchart for explaining an example of operation of a target hitting game.

FIG. 12 is a flowchart for explaining an example of the operation of the target hitting game in the game system 1 according to the present embodiment.

First, in a player terminal 20, upon receiving an operation input made by a player from the terminal input unit 23, the terminal control unit 21 transmits a command (target hitting game start page request) for acquiring a start page (game screen) of the target hitting game to the server device 10 via the terminal communication unit 25 (S101).

Subsequently, upon receiving the target hitting game start page request transmitted from the player terminal 20, the server device 10 executes a card placement process of placing game cards in respective unit areas of the card placement area (S102). Specifically, the placement unit 111 places game cards in the card placement area set for the player on the basis of the player information (see FIG. 6) and the card placement information (see FIG. 10) stored in the storage unit 12.

Subsequently, the server device 10 causes the screen data generation unit 119 to generate screen data (HTML file) for displaying the start page (web page) of the target hitting game on the player terminal 20 (S103). The screen data generation unit 119 generates screen data of the start page containing the card placement area in which game cards are placed by the placement unit 111.

The server device 10 then transmits the thus generated screen data (HTML file) corresponding to the start page of the target hitting game to the requesting player terminal 20 via the network (S104).

Subsequently, upon receiving the screen data (HTML data) transmitted from the server device 10, the player terminal 20 analyzes the screen data to display the start page (web page) of the target hitting game on the terminal display unit 24 (S105).

Figure 13:
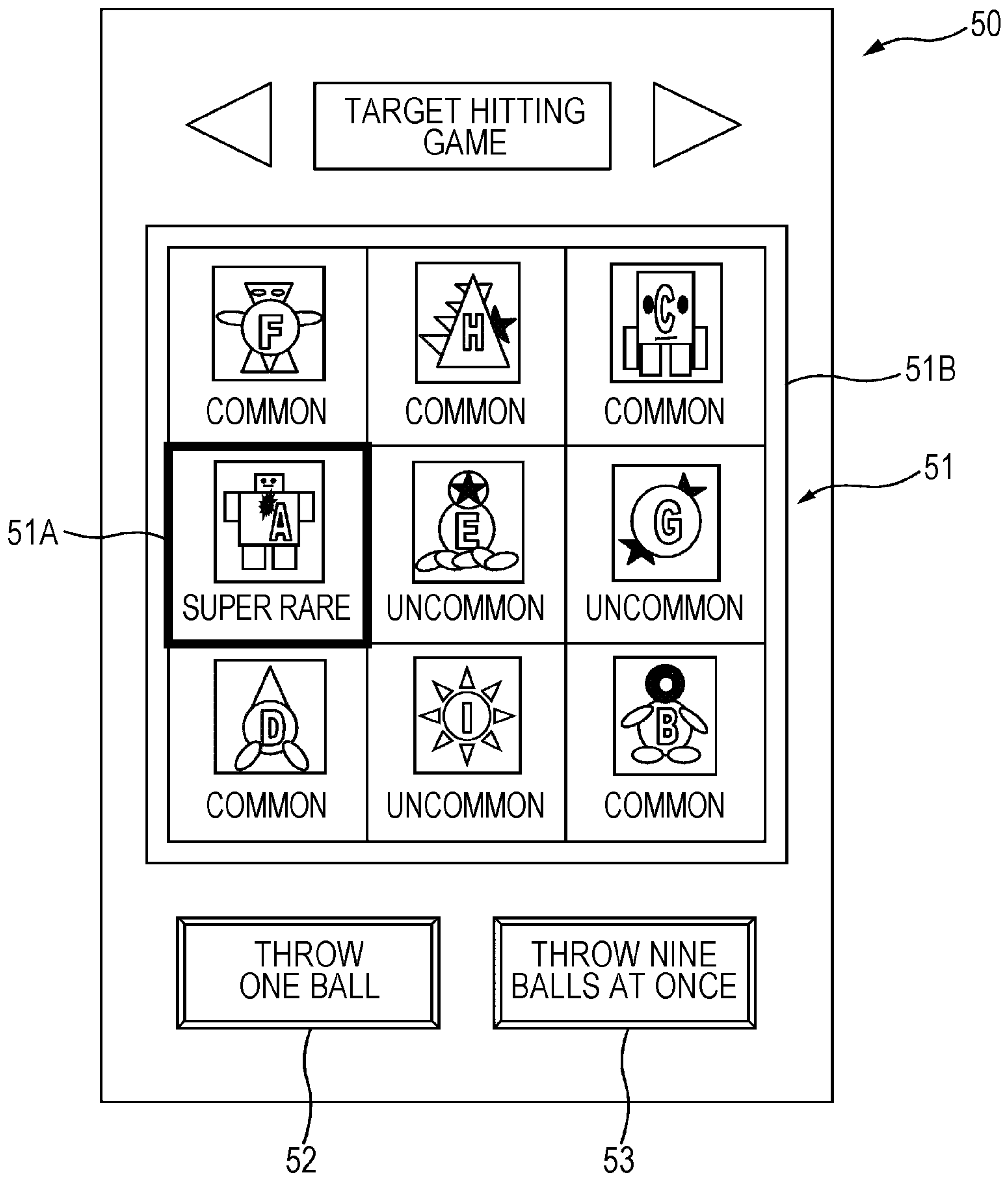
FIG. 13 is a diagram illustrating an example of a game screen of the target hitting game.

FIG. 13 is a diagram illustrating an example of a game screen 50 (start page 50) for the target hitting game displayed on the terminal display unit 24. The start page 50 contains the card placement area 51, an operation button 52 for throwing one ball, and an operation button 53 for throwing nine balls at once. Herein, a super rare card 51A that is an example of the special card is placed in the card placement area 51. Furthermore, a frame area 51B is provided around the card placement area 51.

Subsequently, referring back to FIG. 12, when the operation button 52 or the operation button 53 is selected by the player while the start page 50 of the target hitting game illustrated in FIG. 13 is displayed on the terminal display unit 24, the terminal control unit 21 of the player terminal 20 transmits a command (card request) requesting to give a card on the basis of this operation information to the server device 10 via the terminal communication unit 25 (S106).

Subsequently, upon receiving the card request transmitted from the player terminal 20, the server device 10 executes a lottery process through the target hitting game for giving a game card to the player (S107).

Specifically, the lottery processing unit 113B determines whether or not a super rare card 51A (special card) is placed in the card placement area 51 on the basis of the card placement information (see FIG. 10) of the player. If no super rare card 51A is placed in the card placement area 51, the lottery processing unit 113B permits operational input with the operation button 52 and the operation button 53, consumes one or nine balls (see FIG. 6) possessed by the player, and gives one game card selected from the game cards placed in the card placement area 51 or all of the nine game cards to the player. If, on the other hand, a super rare card 51A is placed in the card placement area 51, the lottery processing unit 113B permits only operational input with the operation button 52, consumes one ball (see FIG. 6) possessed by the player, and gives one game card selected from the game cards placed in the card placement area 51 to the player. This is because, the player can easily acquire the super rare card 51A if operational input with the operation button 53 is permitted and all of the nine game cards are given. After game cards are given to the player in this manner, the possessed card information illustrated in FIG. 7 is updated.

In the lottery process through the target hitting game, the rarities of game cards are weighted so that the probability with which a game card is selected varies depending on the rarity. For example, if a super rare card (special card) is placed in only one square out of nine squares and uncommon cards are placed in the remaining eight squares, the lottery processing unit 113B sets the weight on the super rare card to 1 and the weight on the uncommon cards to 10 so that the probability with which the super rare card is selected is set to 1/81 and the probability with which each uncommon card is selected to 10/81. This prevents the super rare card and the uncommon cards from being selected with an equal probability of 1/9.

Furthermore, in the lottery process through the target hitting game, if any super rare card 51A (special card) is placed in the card placement area 51, the period of time during which the super rare card 51A is placed in the card placement area 51 is limited. Specifically, the placement unit 111 starts counting the time elapsed when the super rare card 51A is placed in the card placement area 51 (starts counting the time elapsed when the card placement information illustrated in FIG. 10 is updated), and performs control so that the super rare card 51A is not placed in the card placement area 51 (so that the square in which the super rare card 51A is placed is emptied) when a preset time limit (15 minutes, for example) elapsed. Subsequently, the placement unit 111 places a new game card selected from the deck in the square in place of the super rare card 51A.

Furthermore, in the lottery process through the target hitting game, if it is determined to give the super rare card 51A (special card) to the player (supported player) as a result of the lottery, a special item is given as a reward to another player (supporting player) who specially supported the player. Specifically, the lottery processing unit 113B refers to the player information illustrated in FIG. 6 and the support log information illustrated in FIG. 11 to identify the player who specially supported the supported player and give the special item selected from the item information illustrated in FIG. 5. After the special item is thus given, the possessed item information illustrated in FIG. 8 is updated.

Subsequently, when the game card to be given to the player is determined as a result of executing the lottery process, the server device 10 causes the screen data generation unit 119 to generate screen data presenting the result of the target hitting game (S108). The server device 10 then transmits the screen data generated by the screen data generation unit 119 to the requesting player terminal 20 via the network 2 (S109).

Subsequently, upon receiving the screen data (HTML data) transmitted from the server device 10, the player terminal 20 analyzes the screen data to display the game screen (web page) presenting the result of the target hitting game on the terminal display unit 24 (S110). The player can see the game card given as a result of the target hitting game by looking at the game screen displayed on the terminal display unit 24.

<Operation on Support/Special Support>

Figure 14:
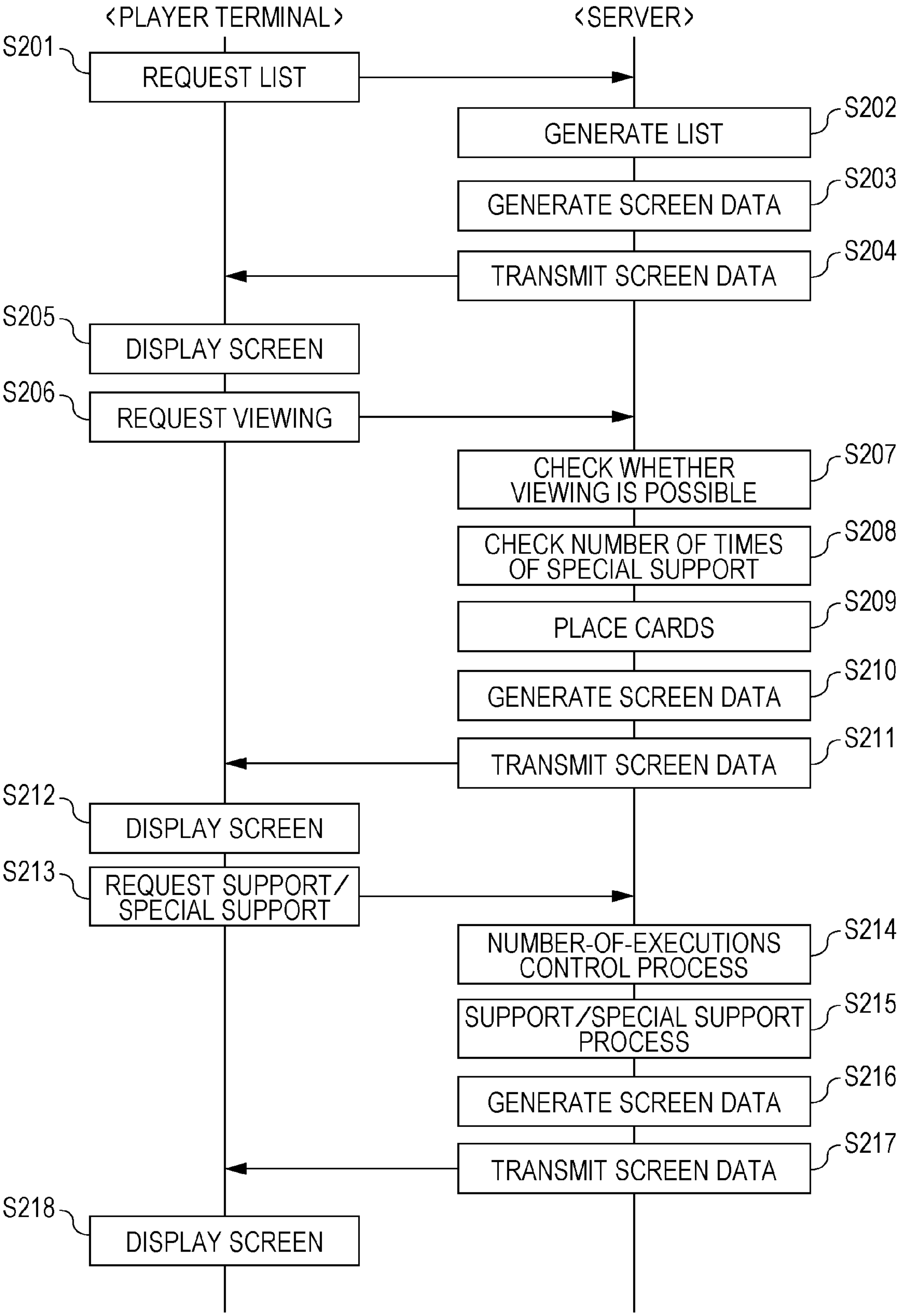
FIG. 14 is a flowchart for explaining an example of operation of a support and a special support.

FIG. 14 is a flowchart for explaining an example of the operation of the support and the special support in the game system 1 according to the present embodiment.

First, in a player terminal 20, upon receiving an operation input made by a supporting player from the terminal input unit 23, the terminal control unit 21 transmits a command (list request) for acquiring a list of supported players to the server device 10 via the terminal communication unit 25 (S201).

Subsequently, upon receiving the list request transmitted from the player terminal 20, the server device 10 executes a list generation process of generating a list of supported players trying the target hitting game in an attempt to acquire a super rare card 51A (special card) (S202). Specifically, the control unit 11 refers to the player information illustrated in FIG. 6 and the card placement information illustrated in FIG. 10 to extract and list supported players associated with the card placement area 51 in which the super rare card 51A is placed (players trying the target hitting game in an attempt to acquire the super rare card 51A).

Subsequently, the server device 10 causes the screen data generation unit 119 to generate screen data (HTML file) for displaying the game screen (web page) containing the generated list of supported players on the player terminal 20 (S203). The server device 10 transmits the thus generated screen data (HTML file) corresponding to the thus generated game screen (web page) to the requesting player terminal 20 via the network (S204).

Subsequently, upon receiving the screen data (HTML data) transmitted from the server device 10, the player terminal 20 analyzes the screen data to display the game screen containing the list of supported players on the terminal display unit 24 (S205).

Figure 15:
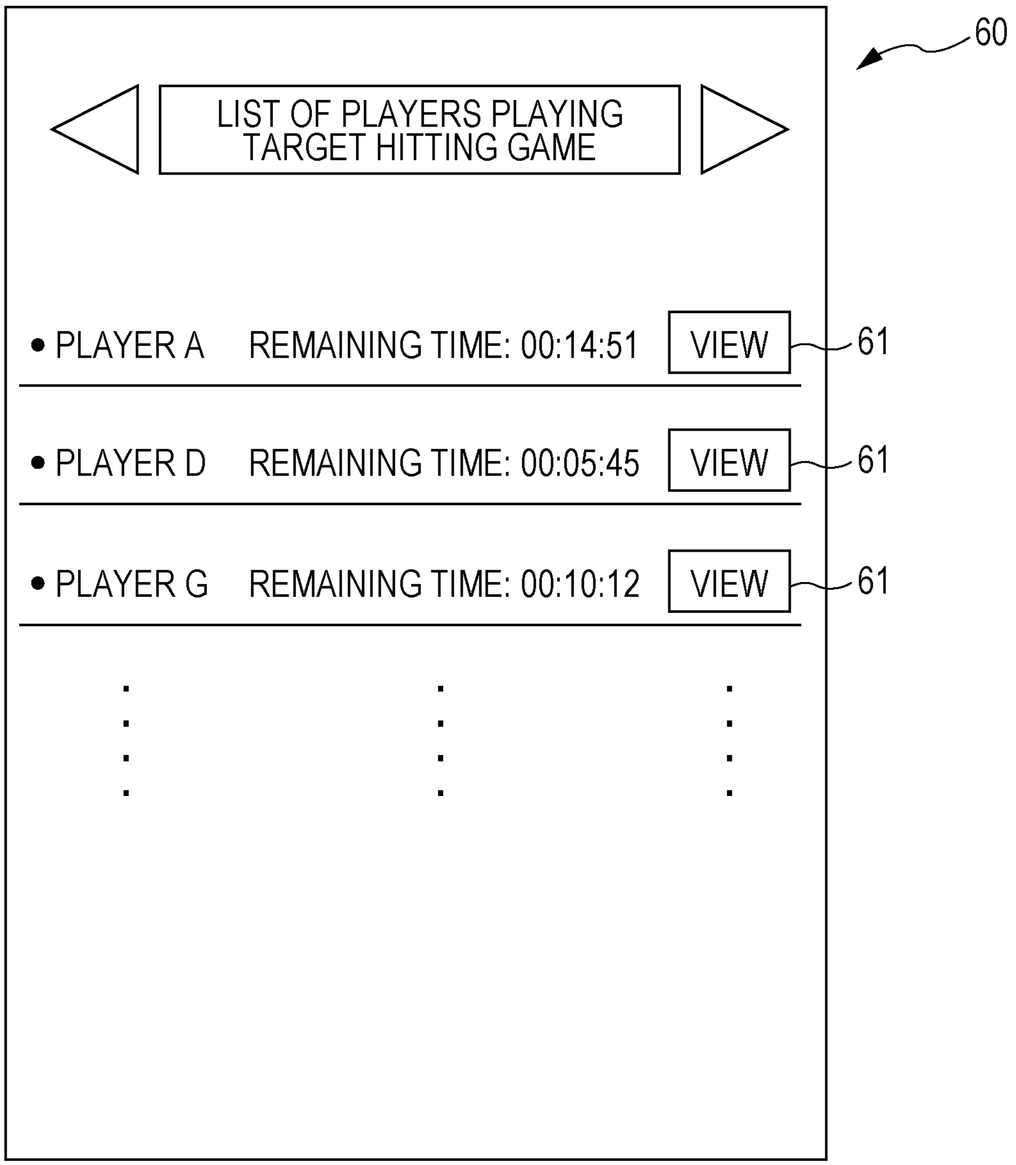
FIG. 15 is a diagram illustrating an example of a game screen containing a list.

FIG. 15 is a diagram illustrating an example of a game screen 60 containing the list of supported players. The game screen 60 displays the list of supported players trying to acquire the super rare card 51A. The game screen 60 also displays the remaining time before the super rare card 51A is deleted from the card placement area 51 (the remaining time before the preset time limit (15 minutes) is reached) and an operation button 61 for viewing the card placement area 51 from which the supported player is trying to acquire the super rare card 51A in association with each supported player trying to acquire the super rare card 51A.

Subsequently, when an operation button 61 associated with a supported player to be viewed is selected from the list while the game screen 60 illustrated in FIG. 15 is displayed on the terminal display unit 24, the terminal control unit 21 of the player terminal 20 transmits a command (viewing request) for viewing the card placement area 51 (the card placement area in which game cards that are candidates for the lottery in the target hitting game are placed) associated with the supported player trying to acquire the super rare card 51A to the server device 10 via the terminal communication unit 25 (S206).

Subsequently, upon receiving the viewing request transmitted from the player terminal 20, the server device 10 executes a process of checking whether or not the card placement area 51 of the supported player to be viewed can be viewed (S207). Specifically, the control unit 11 refers to the player information illustrated in FIG. 6 and the card placement information illustrated in FIG. 10 to determine whether or not the super rare card 51A is placed in the card placement area 51 of the supported player to be viewed (whether or not the super rare card 51A is already acquired). If the super rare card 51A is already acquired, the card placement area 51 cannot be viewed. The control unit 11 further determines whether or not the remaining time before the super rare card 51A is deleted from the card placement area 51 is 0 minutes (that is, whether or not the time elapsed since the super rare card 51A is placed in the card placement area 51 has reached the preset time limit (15 minutes)). If the remaining time is 0 minutes, the card placement area 51 cannot be viewed.

Subsequently, if it is determined in the checking process in S207 that the card placement area 51 of the supported player to be viewed can be viewed, the server device 10 executes a process of checking the number of times of the special support for the supported player to be viewed (that is, a player trying the target hitting game in an attempt to acquire the super rare card 51A) (S208). Specifically, the control unit 11 refers to the player information illustrated in FIG. 6 to obtain the number of times of the special support for the supported player trying to acquire the super rare card 51A by another player (supporting player).

Subsequently, the server device 10 executes a card placement process of placing game cards in the card placement area 51 for the supported player to be viewed (S209). Specifically, the placement unit 111 refers to the player information illustrated in FIG. 6 and the card placement information illustrated in FIG. 10 to place game cards in the card placement area 51 for the supported player to be viewed.

Subsequently, the server device 10 causes the screen data generation unit 119 to generate screen data (HTML file) for displaying a game screen (web page) containing the card placement area 51 for the supported player to be viewed on the player terminal 20 (S210).

The screen data generation unit 119 generates screen data of the game screen for viewing containing the card placement area 51 in which game cards are placed by the placement unit 111. In this process, the screen data generation unit 119 changes the display state of the frame area 51B displayed around the card placement are 51 according to the number of times of special support obtained as a result of the checking process in S208. For example, the screen data generation unit 119 changes the display color of the frame area 51B in the order of white→yellow→red→silver→gold as the number of times of the special support increases. In this manner, the supported player can make the display of the card placement area 51 louder to emphasize the card placement area 51 as a result of the special support of the supporting player. In the meantime, the supporting player is appreciated by the supported player and can expect special support by the supported player when the supporting player in turn tries the target hitting game (support in return). As a result, the players support one another, which further stimulate communication.

Note that the screen data generation unit 119 need not gradually change the display state of the frame area 51B with the increase in the number of times of special support but may change the display state of the frame area 51B when the viewing request is for viewing the card placement area 51 of a supported player that has ever been specially supported (that has been specially supported at least once).

The server device 10 then transmits the thus generated screen data (HTML file) corresponding to the game screen for viewing to the requesting player terminal 20 via the network (S211).

Subsequently, upon receiving the screen data (HTML data) transmitted from the server device 10, the player terminal 20 analyzes the screen data to display the game screen for viewing on the terminal display unit 24 (S212).

Figure 16:
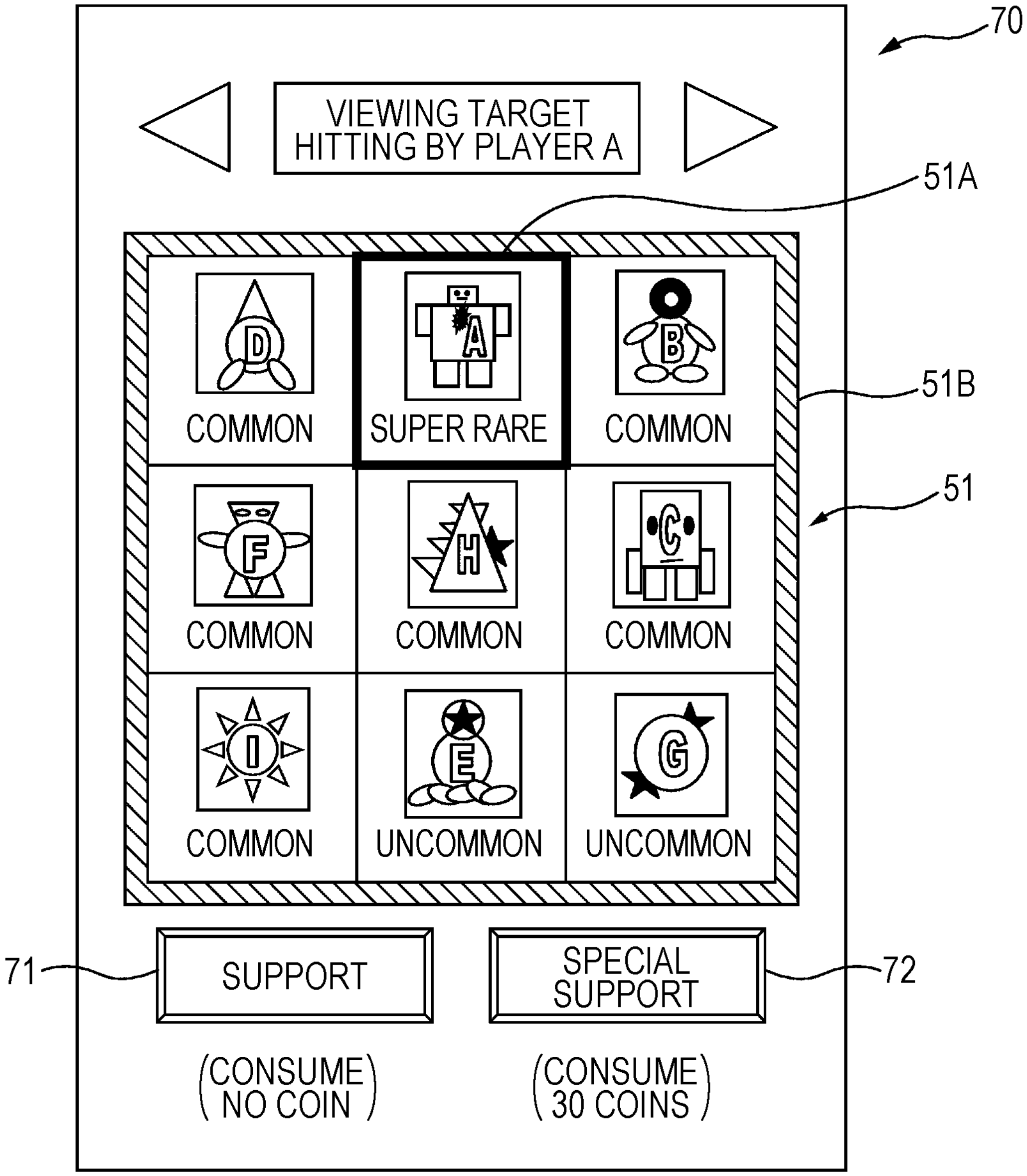
FIG. 16 is a diagram illustrating an example of a game screen for viewing.

FIG. 16 is a diagram illustrating an example of a game screen 70 for viewing displayed on the terminal display unit 24. The game screen 70 for viewing contains the card placement area 51 of the supported player to be viewed (that is, the player trying the target hitting game in an attempt to acquire the super rare card 51A), an operation button 71 for supporting the supported player trying the target hitting game, and an operation button 72 for specially supporting the supported player trying the target hitting game. If the operation button 71 is selected by the supporting player, a support process for supporting the supported player trying the target hitting game will be executed without consuming coins (virtual currency). If the operation button 72 is selected by the supporting player, a special support process for specially supporting the supported player trying the target hitting game will be executed by consuming 30 coins (virtual currency).

Subsequently, if the operation button 71 is selected by the supporting player while the game screen 70 illustrated in FIG. 16 is displayed on the terminal display unit 24, the terminal control unit 21 of the player terminal 20 transmits a command (support request) requesting to support the supported player trying the target hitting game by the supporting player to the server device 10. If the operation button 72 is selected by the supporting player, the terminal control unit 21 transmits a command (special support request) requesting to specially support the supported player trying the target hitting game by the supporting player to the server device 10 (S213).

Subsequently, upon receiving the support request or the special support request transmitted from the player terminal 20, the server device 10 executes a number-of-executions control process (S214). Subsequently, upon receiving a support request for supporting the supported player trying the target hitting game by the supporting player, the number-of-executions control unit 116 refers to the player information illustrated in FIG. 6 to obtain the number of times of support of the supporting player for other players. The number-of-executions control unit 116 limits execution of the support process by the support processing unit 114 if the obtained number is determined to be larger than one (a predetermined number set in advance), and permits execution of the support process if the obtained number is equal to or smaller than one. Furthermore, upon receiving a special support request for specially supporting the supported player trying the target hitting game by the supporting player, the number-of-executions control unit 116 refers to the player information illustrated in FIG. 6 to obtain the number of times of special support of the supporting player for other players. The number-of-executions control unit 116 limits execution of the special support process by the special support processing unit 115 if the obtained number is determined to be larger than ten (a predetermined number set in advance), and permits execution of the special support process if the obtained number is equal to or smaller than ten.

Subsequently, when the support or the special support of the supporting player for the supported player trying the target hitting game is permitted as a resulting of executing the number-or-executions control process, the server device 10 executes a support or special support process (S215). Specifically, the support processing unit 114 gives one ball to the supported player and the supporting player without consuming the virtual currency of the supporting player, and updates the player information (see FIG. 6) of each of the players. In this process, the count processing unit 117 counts the number of times of support of the supporting player for other players (supported players) and the number of times of support of other players (supporting players) for the supported player, and updates the player information (see FIG. 6) of each of the players. The special support processing unit 115 consumes 30 coins (30 points) of the virtual currency possessed by the supporting player, gives three balls to the supported player and the supporting player, and updates the player information (see FIG. 6) of each of the players. In this process, the count processing unit 117 counts the number of times of special support of the supporting player for other players (supported players) and the number of times of special support of other players (supporting players) for the supported player, and updates the player information (see FIG. 6) of each of the players.

Subsequently, after the predetermined number of balls are given to the player as a result of executing the support or special support process, the server device 10 causes the screen data generation unit 119 to generate screen data presenting the result of the support or special support (S216). The server device 10 then transmits the screen data generated by the screen data generation unit 119 to the requesting player terminal 20 via the network 2 (S217).

Subsequently, upon receiving the screen data (HTML data) transmitted from the server device 10, the player terminal 20 analyzes the screen data to display the game screen (web page) presenting the result of the support or special support on the terminal display unit 24 (S218). The supporting player can confirm that the predetermined number of balls are given as a result of the support or special support by looking at the game screen displayed on the terminal display unit 24.

<Operation on Acquisition Game>

Here, an example of operation of the acquisition game in the game system 1 according to the present embodiment will be described. Upon receiving a game start request transmitted from the player terminal 20, the server device 10 executes an acquisition game process.

Specifically, the acquisition game processing unit 113C determines whether or not to cause a predetermined character (predetermined game card) to appear for the player. When it is determined to cause the predetermined character to appear by the acquisition game processing unit 113C, the screen data generation unit 119 generates screen data for displaying a game screen (web page) presenting encounter with the predetermined character on the player terminal 20.

Figure 17:
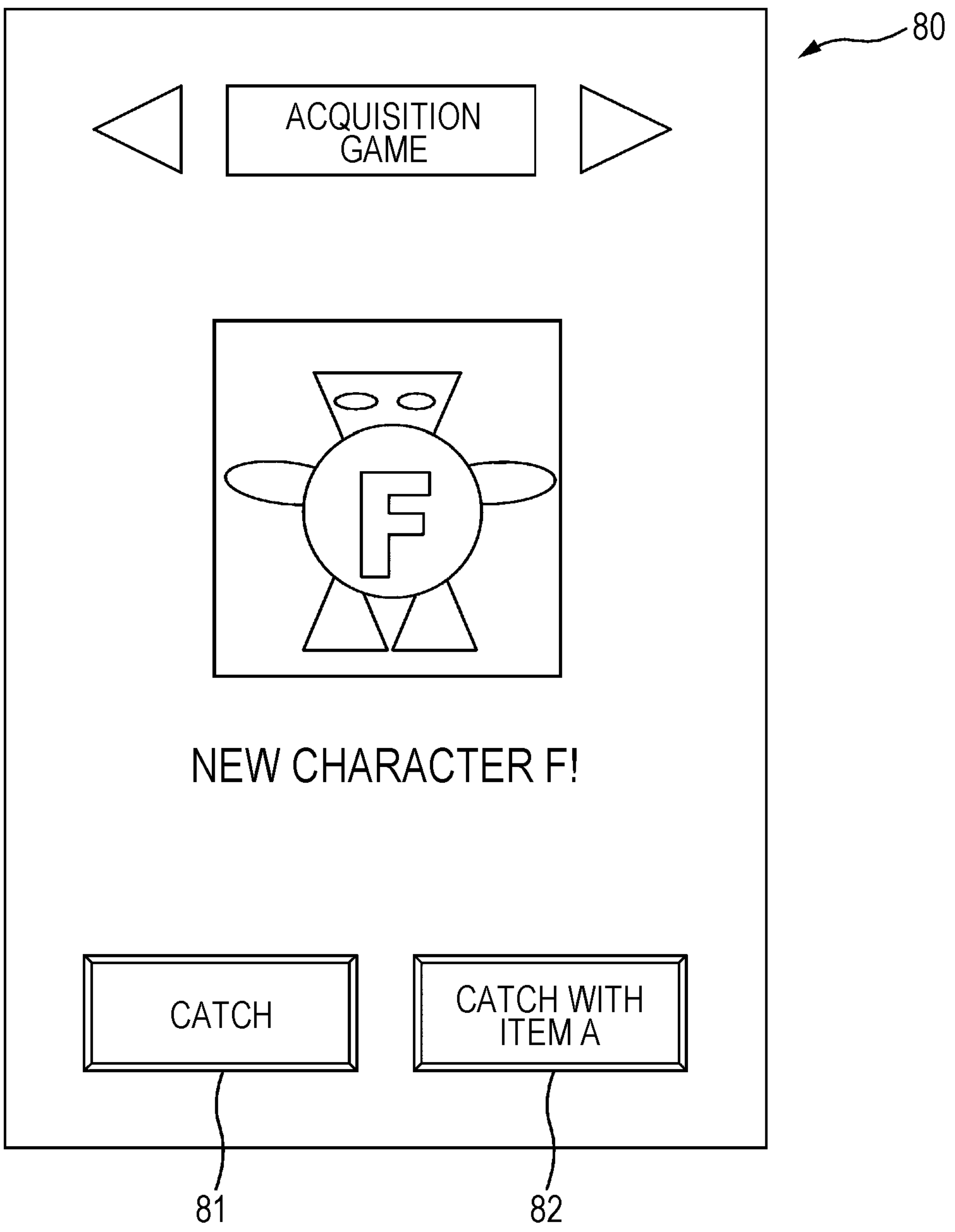
FIG. 17 is a diagram illustrating an example of a game screen of an acquired game.

FIG. 17 is a diagram illustrating an example of a game screen 80 (a game screen presenting encounter with a predetermined character) of the acquisition game. The game screen 80 contains information indicating the appearing predetermined character ("character F"), and operation buttons 81 and 82 for catching the appearing character. When the operation button 81 or 82 is selected by the player while the game screen 80 illustrated in FIG. 17 is displayed on the terminal display unit 24, the player terminal 20 transmits a command (catching request) requesting to catch the "character F" to the server device 10.

Upon receiving the catching request transmitted from the player terminal 20, the server device 10 executes a process of determining whether the result of catching of the "character F" is a success or a failure. Specifically, if the operation button 81 is selected by the player, the acquisition game processing unit 113C determines the result of catching the "character F" to be a success or a failure with a predetermined probability without consuming a predetermined item possessed by the player. If the operation button 82 is selected by the player, the acquisition game processing unit 113C determines the result of catching the "character F" to be a success with a probability of 100% by consuming the predetermined item (item A) possessed by the player (that is, the result of catching the "character F" is always a success by using the predetermined item) on the basis of the possessed item information illustrated in FIG. 8. Note that the predetermined item is an item that the player can purchase by consuming 100 coins of the virtual currency. Specifically, upon receiving an exchange request (purchase request) from the player, the exchange processing unit 118 executes an exchange process of exchanging the virtual currency (100 coins) possessed by the player for the predetermined item (item A) on the basis of the player information illustrated in FIG. 6.

If the result of catching the "character F" is determined to be a success, the acquisition game processing unit 113C then gives one ball to the player and updates the player information (see FIG. 6).

In this manner, a ball that can be used for the target hitting game can also be given to the player by executing the acquisition game process. In addition, in the present embodiment, the proportion of the number of balls (three) given through the special support process described for the amount of virtual currency (30 coins) consumed in the special support process is set to be larger than the proportion of the number of balls (one) given through the acquisition game for the amount of virtual currency (100 coins) exchanged for a game item. In this manner, since balls can be more efficiently acquired through the special support than through the acquisition game by using an item, the special support will be positively used. As a result, communication between players can further be stimulated.

Alternatively, the number of balls (three) given to the player in the special support process may be simply set to be larger than the number of balls (one) given in the acquisition game process independent of the amount of the virtual currency.

<Summary>

As described above, with the game system 1 according to the present embodiment, when a super rare card 51A (special card) is placed in the card placement area 51 by the placement unit 111, the supported player can try the target hitting game in an attempt to acquire the super rare card 51A. While the supported player is trying the target hitting game, the special support process for specially supporting the supported player by the supporting player is executed by consuming the virtual currency in addition to the support process for supporting the supported player by the supporting player. Although the number of executions of the support process is limited to a predetermined number or smaller, the execution of the special support process is permitted a number of times larger than the predetermined number. As a result, since the execution of the special support process is permitted even when the number of executions of the support process is limited, the supporting player's incentive to support another player can be increased and communication between players can be stimulated.

Other Embodiments

The above-described embodiment has been given for easy understanding of the present invention, and is not to construe the present invention in a limited manner. The present invention can be modified and improved without departing from the gist of the invention and includes its equivalents. In particular, embodiments described below are also included in the present invention.

<Target Hitting Game>

Figure 18:
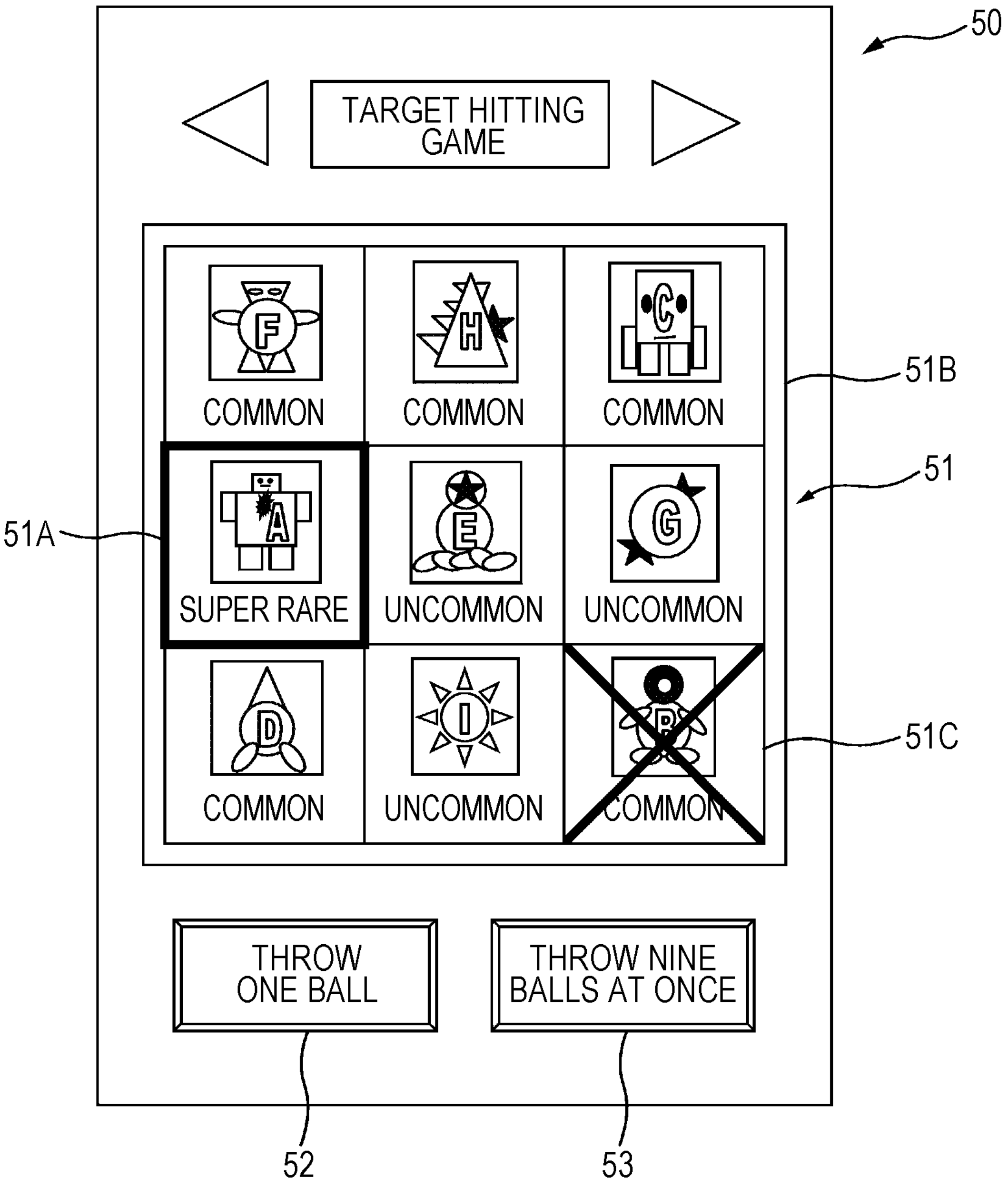
FIG. 18 is a diagram illustrating an example of a game screen of a target hitting game.

The target hitting game is described as one example of the lottery game in the embodiment described above. In the target hitting game, the probability with which a special card (super rare card 51A) is selected may be increased depending on the numbers of executions of the support process and the special support process. For example, while the supported player is trying the target hitting game in an attempt to acquire the super rare card 51A, any of the cards other than the super rare card 51A may be selected as a block card 51C from the cards placed in the card placement area 51, the number of block cards 51C corresponding to the number of times of support and special support of the supporting player, as illustrated in FIG. 18. In other words, the probability with which the super rare card 51A is selected is increased by excluding the block card 51C from the lottery of the target hitting game. Specifically, the count processing unit 117 counts the number of times of support and special support of another player (supporting player) on the basis of the player information illustrated in FIG. 6. The lottery processing unit 113B selects block cards 51C from the card placement area 51 according to the number of times of support counted by the count processing unit 117. For example, the lottery processing unit 113B selects one block card 51C if the counted number of times of support is five to nine, two block cards 51C if the counted number is 10 to 14, and three block cards 51C if the counted number is 15 or larger. Upon receiving a card request from the supported player, the lottery processing unit 113B then excludes the block cards 51C from selection and selects a card to be given to the supported player from the card placement area 51. This can encourage use of support and special support, and further stimulate communication between players.

<Server Device>

In the above-described embodiment, the game system 1 provided with one server device 10 as an example of a server device has been exemplarily described. However, the game system 1 is not limited to this example, and may be provided with a plurality of server devices 10 as an example of the server device. Specifically, a plurality of server devices 10 may be connected through a network 2, and each of the server devices 10 may execute various types of processing in a distributed manner. Note that the server device 10 is an example of a computer.

<Information Processing Device>

In the game system 1 in the above-described embodiment, an example in which various types of information processing are executed on the basis of a game program by the server device 10 and the player terminal 20 in cooperation with each other is described. However, the game system 1 is not limited to the example. The various types of information processing may be executed by the player terminal 20 alone or by the server device 10 alone as an information processing device on the basis of a game program.

Furthermore, the player terminal 20 may bear some of the functions of the information processing device. In this case, the server device 10 and the player terminal 20 constitute the information processing device.

Note that the information processing device is an example of a computer.

What is claimed is:

1. A non-transitory computer-readable storage medium storing game program causing a computer to execute:

a recording process configured to store a lottery point balance and a play point balance in association with an account maintained for each player in a storage unit;

a lottery process of, upon receiving a content request from a player, subtracting a lottery point from the balance associated with the player, and executing a lottery game for giving a game content selected from multiple game contents to the player, the lottery game configured with instructions to provide one or more game screens to a display associated with the player;

a support process of, upon receiving a support request for supporting a first player playing the lottery game by a second player, adding a lottery point to the balance associated with each of the first player and the second player without subtracting a play point from the balance associated with the second player;

a special support process of, upon receiving a special support request for supporting a first player playing the lottery game by a second player, subtracting a play point from the balance associated with the second player and adding a lottery point to the balance associated with the first player and the balance associated with the second player; and a number-of-executions control process of limiting the number of executions of the support process to a predetermined number or smaller and permitting execution of the special support process a number of times larger than the predetermined number.

2. A non-transitory computer-readable storage medium storing game program causing a computer to execute:

a recording process configured to store a lottery point balance and a play point balance in association with an account maintained for each player in a storage unit;

a lottery process of, upon receiving a content request from a player, subtracting a lottery point from the balance of the player, and executing a lottery game for giving a game content selected from multiple game contents to the player, the lottery game configured with instructions to provide one or more game screens to a display associated with the player;

a support process of, upon receiving a support request for supporting a first player playing the lottery game by a second player, subtracting a predetermined amount of play points from the balance associated with the second player and adding a lottery point to the balance associated with each of the first player and the second player;

a special support process of, upon receiving a special support request for supporting a first player playing the lottery game by a second player, subtracting an amount of play points from the balance associated with the second player larger than the predetermined amount and adding a lottery point to the balance associated with each of the first player and the second player; and a number-of-executions control process of limiting the number of executions of the support process to a predetermined number or smaller and permitting execution of the special support process a number of times larger than the predetermined number.

3. The non-transitory computer-readable storage medium storing game program according to claim 1 wherein the program further causes the computer to execute:

an exchange process of, upon receiving an exchange request from the second player, exchanging a play point associated with the second player for a game item; and an acquisition game process of, upon receiving a game start request from the second player, conducting a game allowing the second player to acquire a lottery point by consuming the game item, and a proportion of the amount of lottery point given in the special support process to the amount of play point consumed in the special support process is set to be larger than a proportion of the amount of lottery point acquired through the acquisition game process to the amount of play point exchanged for the game item in the exchange process.

4. The non-transitory computer-readable storage medium storing game program according to claim 1 wherein the program further causes the computer to execute:

a screen data generation process of, upon receiving a viewing request from a second player for viewing game contents for the first player playing the lottery game, generating a game screen for allowing the second player to view game contents that are candidates for selection in the lottery game being played by the first player, and in the screen data generation process, the game screen in a different display state is generated when the viewing request from the second player is a viewing request for viewing the game contents that are candidates for the first player who has been specially supported.

5. The non-transitory computer-readable storage medium storing game program according to claim 1 wherein the program further causes the computer to execute:

a count process of counting the numbers of executions of the support process and the special support process, and in the lottery process, a proportion with which a special game content is selected in the lottery game is increased according to the numbers counted in the count process.

6. An information processing device comprising:

a memory configured to store a lottery point balance and a play point balance in association with an account maintained for each player; and a processor, configured to execute:

a lottery processing unit configured to execute a lottery game for giving a game content selected from multiple game contents to a player by subtracting a lottery point from the balance associated with the player, the lottery game configured with instructions to provide one or more game screens to a display associated with the player;

a support processing unit configured to, upon receiving a support request for supporting a first player playing the lottery game by a second player, add a lottery point to the balance associated with each of the first player and the second player without subtracting a play point from the balance associated with the second player;

a special support processing unit configured to, upon receiving a special support request for supporting a first player playing the lottery game by a second player, subtract a play point from the balance associated with the second player and add a lottery point to balance associated with each of the first player and the second player; and a number-of-executions control unit configured to limit the number of executions of the support process to a predetermined number or smaller and permit execution of the special support process a number of times larger than the predetermined number.

* * * * *